United States Patent
Sugano et al.

(10) Patent No.: US 6,321,178 B1
(45) Date of Patent: Nov. 20, 2001

(54) DIAGNOSIS APPARATUS FOR SELF-PROPELLED VEHICLE

(75) Inventors: Yukio Sugano, Shiraoka-machi; Genichirou Watanabe; Nobuki Hasegawa, both of Oyama, all of (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/194,731

(22) PCT Filed: Jun. 11, 1997

(86) PCT No.: PCT/JP97/02020

§ 371 Date: Dec. 2, 1998

§ 102(e) Date: Dec. 2, 1998

(87) PCT Pub. No.: WO97/47489

PCT Pub. Date: Dec. 18, 1997

(30) Foreign Application Priority Data

Jun. 12, 1996 (JP) .................................................. 8-172980

(51) Int. Cl.[7] ........................................................ G06F 11/30

(52) U.S. Cl. .............................. 702/182; 702/184; 701/35

(58) Field of Search ................................... 702/182, 184; 177/141; 364/442; 5/561; 701/35

(56) References Cited

U.S. PATENT DOCUMENTS

| | | | |
|---|---|---|---|
| Re. 35,607 | * 9/1997 | Nagamune et al. | 364/561 |
| 4,845,630 | * 7/1989 | Stephens | 364/442 |
| 5,250,761 | * 10/1993 | Koyanagi | 177/141 |
| 5,301,113 | * 4/1994 | To et al. | 364/442 |
| 5,578,748 | * 11/1996 | Brehob et al. | 73/114 |
| 5,652,378 | * 7/1997 | Dussault | 73/114 |
| 5,659,470 | * 8/1997 | Goska et al. | 364/424.04 |
| 6,061,614 | * 5/2000 | Carrender et al. | 701/33 |

FOREIGN PATENT DOCUMENTS

| | | |
|---|---|---|
| 41-3561 | 3/1966 | (JP) . |
| 47-26053 | 10/1972 | (JP) . |
| 52-52678 | 4/1977 | (JP) . |
| 56-14907 | 2/1981 | (JP) . |
| 58-84394 | 5/1983 | (JP) . |
| 58-84397 | 5/1983 | (JP) . |
| 58-148912 | 9/1983 | (JP) . |
| 59-98935 | 6/1984 | (JP) . |
| 59-119494 | 7/1984 | (JP) . |
| 04-183970 | 6/1992 | (JP) . |
| 4-279824 | 10/1992 | (JP) . |
| 5-500559 | 2/1993 | (JP) . |
| 06-10748 | 1/1994 | (JP) . |

* cited by examiner

Primary Examiner—John S. Hilten
Assistant Examiner—Charles H. Nolan, Jr.
(74) Attorney, Agent, or Firm—Sidley Austin Brown & Wood

(57) ABSTRACT

The present invention relates to a diagnosis apparatus which can plan a maintenance plan, a renewal plan, and the like of a self-propelled vehicle, by detecting a work load in addition to an engine condition. Accordingly, there is provided: engine rotating speed detecting means (11), for detecting a rotating speed N of the engine; fuel injection amount detecting means, for detecting a fuel injection amount q per rotation of the engine; loaded weight detecting means, for detecting the weight W of the loaded material; vehicle speed detecting means (14), for detecting the vehicle speed V; and trigger signal oscillating means (82), for oscillating a trigger signal d per predetermined time period $t_o$. Further, there is provided calculating means (83a), which receives each of the signals, which calculates a time period t for which both the rotating speed N having substantially the same value and the fuel injection amount q substantially the same value are maintained on the basis of the number n of the trigger signal d, which calculates an accumulative total fuel injection amount Q, and which successively calculates at least one of a fuel injection amount q1 per unit time and a conveying amount w1 per unit fuel injection amount.

20 Claims, 2 Drawing Sheets

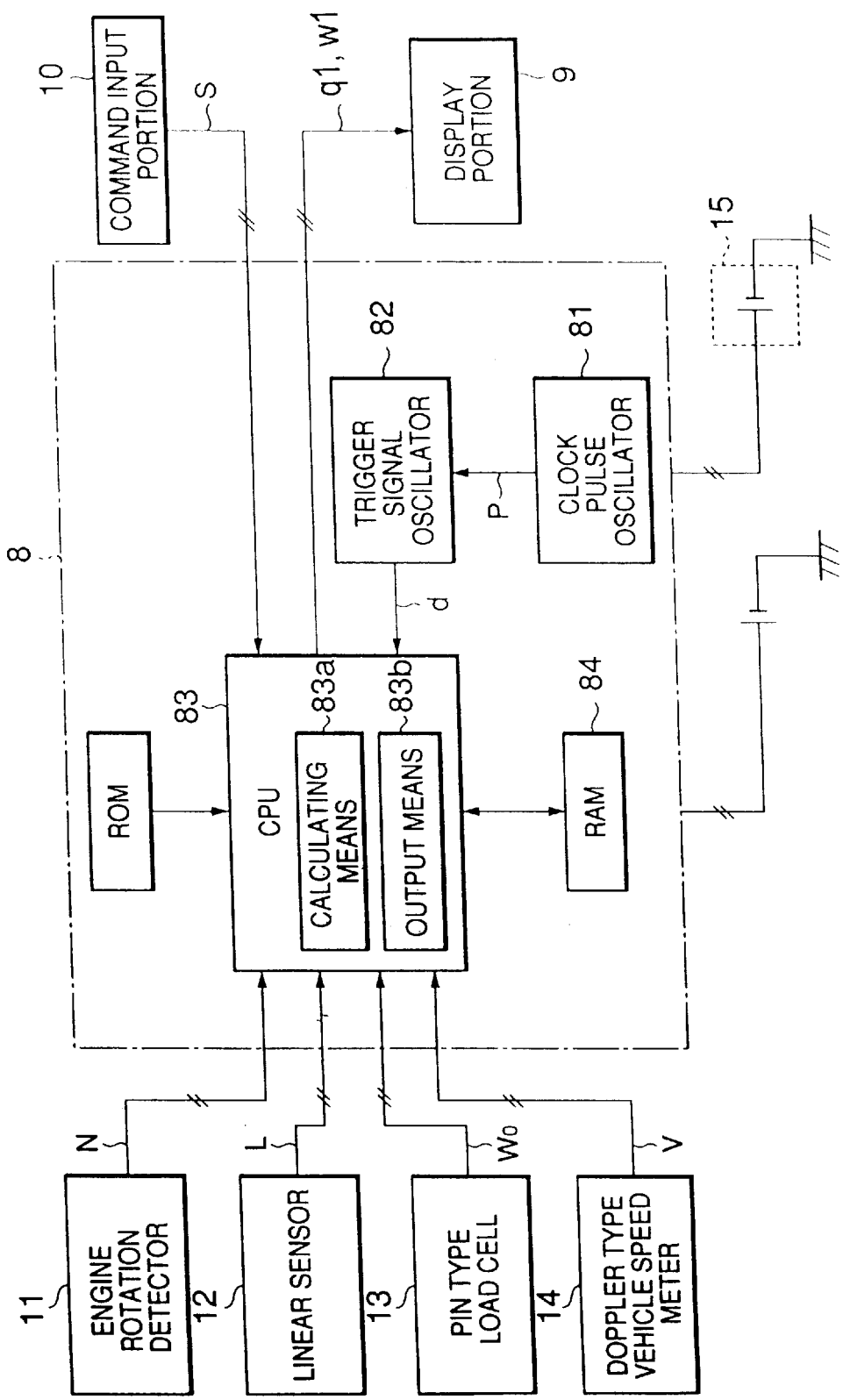

DIAGNOSIS APPARATUS FOR SELF-PROPELLED VEHICLE

TECHNICAL FIELD OF THE INVENTION

The present invention relates to a diagnosis apparatus for a self-propelled vehicle which has an engine mounted thereon and which conveys a loaded material.

BACKGROUND OF THE INVENTION

A self-propelled vehicle is structured so as to convey a passenger and cargo, for example, in a self-propelled vehicle such as a dump truck, which has an engine mounted thereon and which conveys a loaded material. There is one which automatically detects an engine condition and makes a maintenance plan, a renewal plan, and the like. As the engine condition to be detected, there are the engine output and the specific fuel consumption. Then, conventionally, almost all of them are planned on the basis of the engine condition at a time of detection.

Further, in each of Japanese Unexamined Patent Publication Nos. 47-26053, 58-84394, 58-84397, 58-148912, 59-98935, and 59-119494, there is described a structure for storing detected data in a memory mounted on the vehicle and for moving the data to a magnetic card when desired, for inputting the detected data to a microcomputer and the like within a building for calculations.

Still further, in Japanese Unexamined PCT Publication No. 5-500559, there is described a structure of calculating with detected data, by a microcomputer mounted on a vehicle, so as to diagnose a trouble in the engine; and in Japanese Unexamined Patent Publication No. 4-279824, there is described a structure for displaying a specific fuel consumption by a graph on a display apparatus mounted on the vehicle.

However, in the conventional apparatus of the self propelled vehicle mentioned above, there are the following problems.

(1) In the method on the basis of the engine condition at the time of detection, since the data is detected in a pinpoint manner, a trend in the engine condition cannot be determined. Accordingly, there is a problem in that serious trouble can occur before the planned maintenance period or the renewal period, or in that a maintenance or a renewal is performed in spite of good condition.

(2) In the techniques described in each of the publications, the details of the engine condition can not be sufficiently determined.

(3) In the self-propelled vehicle which mounts the engine thereon and conveys a loaded material, in addition to the engine condition being automatically detected and the maintenance plan, the renewal plan, and the like, being made on the basis thereof, it is important to make a maintenance plan, a renewal plan, and the like for the entire vehicle by considering the work load. However, the conventional diagnosis apparatus is insufficient in this regard.

SUMMARY OF THE INVENTION

The present invention is made by taking the conventional problems into consideration, and an object of the present invention is to provide a diagnosis apparatus for a self-propelled vehicle which can make a maintenance plan, a renewal plan, and the like for an entire vehicle, as well as the engine, by detecting a work load in addition to detecting an engine condition.

In accordance with a first aspect of the present invention, there is provided a diagnosis apparatus for a self-propelled vehicle which has an engine mounted thereon and which conveys a loaded material, comprising:

engine rotating speed detecting means for detecting a rotating speed N of the engine;

fuel injection amount detecting means for detecting a fuel injection amount q per rotation of the engine;

loaded weight detecting means for detecting the weight W of the loaded material;

vehicle speed detecting means for detecting the vehicle speed V;

trigger signal oscillating means for oscillating a trigger signal d per predetermined time period $t_o$; and calculating means, which receives the detected value of the rotating speed N from the engine rotating speed detecting means, the fuel injection amount q from the fuel injection amount detecting means, the weight W from the loaded weight detecting means, the vehicle speed V from the vehicle speed detecting means, and the trigger signal d from the trigger signal oscillating means, respectively; which calculates a time period t ($=n \cdot t_o$) for which both the rotating speed N, having substantially the same value, and the fuel injection amount q, having substantially the same value, are maintained on the basis of the number n of the trigger signal d; which calculates an accumulative total fuel injection amount Q ($=\Sigma q \cdot N \cdot t$); and which successively calculates at least one of a fuel injection amount q1 ($=Q/\Sigma t$) per unit time and a conveying amount w1 ($=\Sigma W \cdot V \cdot t/Q$) per unit fuel injection amount.

In accordance with the structure mentioned above, since the fuel injection amount q1 is a value obtained by dividing the accumulative total fuel injection Q by an accumulative operation time ($\Sigma t$), and the conveying amount w1 is a value obtained by dividing the accumulative work load ($\Sigma W \cdot V \cdot t$, that is, ton km) by the accumulative total fuel injection amount Q, neither of the values q1 and w1 is a pinpoint data detection value in accordance with the prior art, but is a value indicating a trend of the engine condition. Accordingly, the period for maintenance, the period for renewal, and the like, can be accurately planned. Further, since both of the fuel injection amount q1 and the conveying amount w1 can be calculated and displayed, the maintenance plan, the renewal plan, and the like, in a safety side can be made by comparing both the values q1 and w1, and then employing the worse condition. Further, in most cases, each of the detecting means and the calculating means is provided in the self-propelled vehicle even when the purpose thereof is different, so that the structure of the present invention can be easily obtained by only a little upgrading of a conventional calculating means.

In accordance with a second aspect of the present invention, there is provided a diagnosis apparatus for a self-propelled vehicle, further comprising output means for receiving from the calculating means at least one of the fuel injection amount q1 per unit time and the conveying amount w1 per unit fuel injection amount, and for outputting the amount to a display apparatus disposed outside of the self-propelled vehicle.

In accordance with the structure mentioned above, the fuel injection amount q1 and the conveying amount w1 can be stored in a memory mounted on the vehicle, and can be moved to a magnetic card or the like at a desired time, whereby the fuel injection amount q1 and the conveying amount w1 can be displayed outside of the self-propelled vehicle, for example, on a display apparatus within the building. Accordingly, a plurality of self-propelled vehicles can be concentrically controlled.

BRIEF DESCRIPTION OF THE DRAWINGS

FIG. 2 is a control block diagram of a diagnosis apparatus in accordance with the embodiment of the present invention.

BEST MODE FOR CARRYING OUT THE INVENTION

Figure 1:
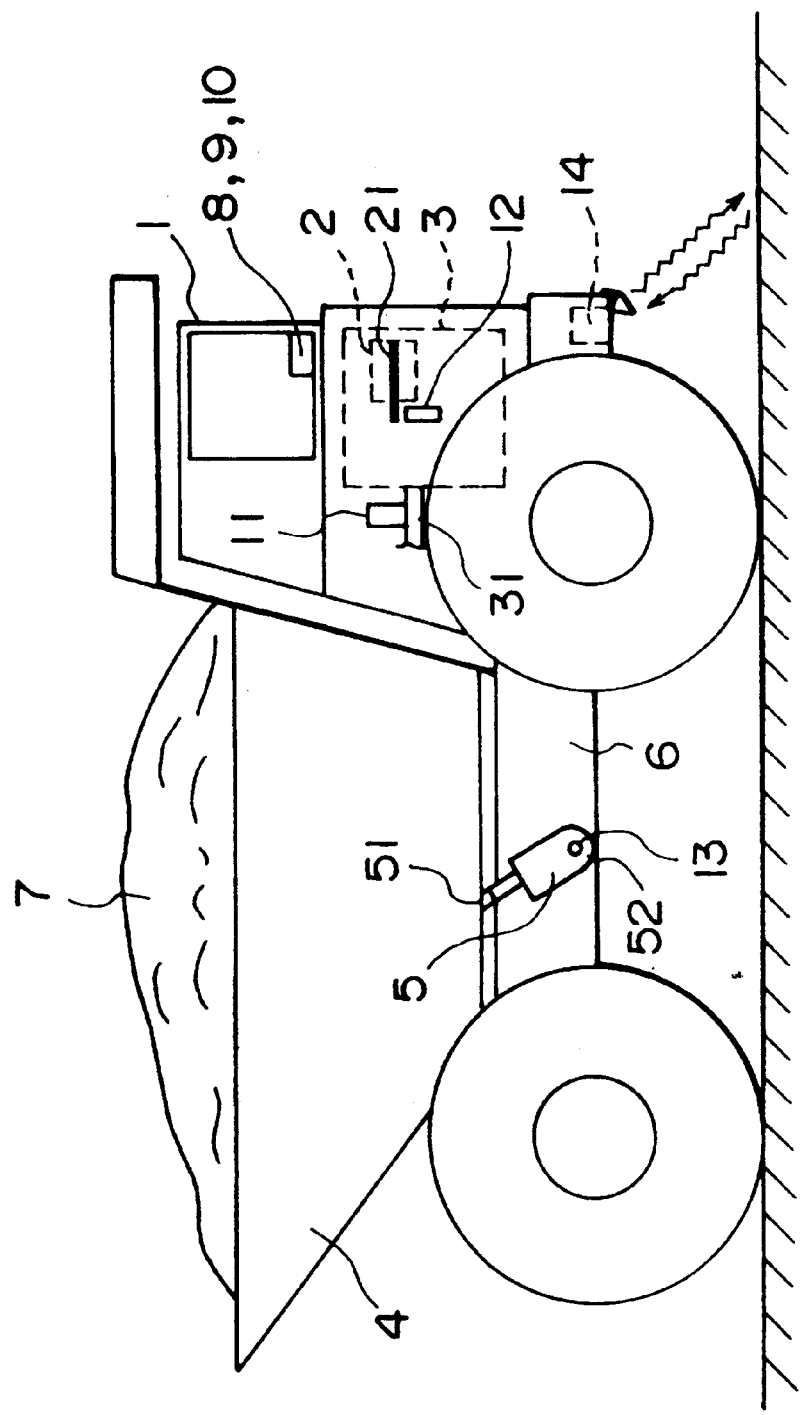
FIG. 1 is a side elevational view of a dump truck, which is provided with a diagnosis apparatus in accordance with an embodiment of the present invention.

An embodiment in accordance with the present invention will be described in detail with reference to FIGS. 1 and 2.

A dump truck is provided with a driver's cab 1; a multiple cylinder diesel engine (hereinafter referred to as an engine) 3, to which a fuel is supplied by a Bausch type fuel injection pump 2; a cargo vessel 4; and a hydraulic cylinder 5, which is connected to a back surface of the vessel 4 at an upper end by a pin 51 and which is connected to a vehicle body frame 6 at a lower end by a pin 52 so as to receive the load of the vessel 4 and loaded material 7. The dump truck is structured so as to self-propel and to convey the loaded material 7 within the vessel 4, and to freely discharge the loaded material 7 by inclining the vessel 4 on the basis of expansion and compression of the hydraulic cylinder 5.

A controller 8 (CPU), a display portion 9, and a command input portion 10 connected thereto, are fixed and provided in the driver's cab 1. Further, an engine rotation detector 11 (engine rotating speed detecting means), for detecting a rotational speed N of the engine 3, is mounted to an output shaft 31 of the engine 3, and the detected value N is inputted to the controller 8.

Further, in a control rack 21 of the fuel injection pump 2, a linear sensor 12, for detecting a moving amount L thereof, is mounted; and the detected value L is inputted to the controller 8. In the controller 8, a fuel injection amount q (not shown) to each of the cylinders of the engine 3 in correspondence to the moving amount L is calculated. That is, the fuel injection amount detecting means is constituted by the linear sensor 12 and the controller 8.

Since, the fuel injection pump 2 is a Bausch type in this embodiment, the fuel injection amount detecting means is constituted by the linear sensor 12 for detecting the moving amount L of the control rack 21; however, it can be constituted by a structure for detecting a tensile force of a governor spring. Further, in the case of a fuel pressure control type (a so-called PT type or a Detroit type) for adjusting a fuel pressure and for supplying an adjusted amount of fuel to each of the cylinders instead of the Bausch type fuel injection pump 2, a fuel pressure meter can be employed in place of the linear sensor 12. Further, in the case of an electronic control type governor for supplying an adjusted amount of fuel to each of the cylinders in accordance with a current adjusted by an electronic control system instead of a mechanical governor, the current itself can be directly inputted to the controller 8 in place of the output of the linear sensor 12.

Here, a pin 13, connecting the lower end 52 of the hydraulic cylinder 5 to the vehicle body frame 6, is constituted by a pin type load cell 13. The pin type load cell 13 detects the load weight $W_o$ on the basis of the vessel 4; the hydraulic cylinder 5, and the loaded material 7, and inputs the detected value $W_o$ to the controller 8. The controller 8 subtracts a weight component on the basis of the vessel 4 and the hydraulic cylinder 5 from the loaded weight $W_o$ so as to calculate a weight W (not shown) on the basis of only the loaded material 7. That is, the loaded material weight detecting means is constituted by the pin type load cell 13 and the controller 8.

A Doppler type vehicle speed meter 14 (vehicle speed detecting means), for emitting an ultrasonic wave obliquely downward toward the front ground surface and for receiving a reflected wave so as to detect the vehicle speed V, is mounted on a front lower surface of the vehicle frame 6. Then, the detected value V is inputted to the controller 8.

As shown in FIG. 2, a clock pulse oscillator 81 and a trigger signal oscillator 82 (trigger signal oscillating means), for setting a stand-up time or a stand-down time of a pulse P per predetermined time period $t_o$ (not shown) ($t_o=1$ minute) oscillated by the clock pulse oscillator 81 to a trigger signal d, are installed within the controller 8. In calculating means 83a of a calculating portion 83, the following processes (A) to (E) are executed.

(A) A process of receiving the trigger signal d from the trigger signal oscillator 82 and calculating a time period t ($=n \cdot t_o$), for which the engine rotating speed N with substantially the same value and the fuel injection amount q with substantially the same value are both maintained from the number of the trigger signal d, is performed. The details are as follows.

The fuel injection amount q is generally set in the following manner. A relation between the engine rotating speed N and the fuel injection amount q per rotation is defined per an angle of inclination of an acceleration pedal or a fuel lever of the fuel governor. For example, in a state wherein the acceleration pedal or the fuel lever is fixed at the maximum inclination angle, the load to the engine 3 is changed from a no load to an overload. In the no load condition, the fuel injection amount q is minimum and the engine rotating speed N becomes maximum, thereby becoming a so-called high idling rotation. When the load is increased, the fuel injection amount q is increased in accordance with a governor function, and the engine rotating speed is lowered. Next, when the load becomes the rated load, the fuel injection amount q becomes maximum, and the engine rotating speed N becomes the rated rotation (the rotating speed at a time of the rated output corresponding to the maximum value of an engine output curve). When the load is further increased to an overload condition, the fuel injection amount q is maintained at the maximum value (of course, there may be a little changing); however, the engine rotating speed N is successively lowered.

That is, from the high idling rotation of the engine 3 to the rated rotation thereof, both of the fuel injection amount q and the engine rotating speed N are largely changed. On the other hand, at a rotation area lower than the rated rotation, the fuel injection amount q is hardly changed, but the engine rotating speed N is continuously changed. Accordingly, only when the time period t, for which both the rotating speed N with substantially the same value and the fuel injection amount q with substantially the same value are maintained, is calculated on the basis of these conditions, an accumulative total fuel injection amount Q ($=\Sigma q \cdot N \cdot t$) shown below can be calculated.

(B) Here, the accumulative total fuel injection amount Q ($=\Sigma q \cdot N \cdot t$) is calculated. That is, at every occurrence when a new time period t ($=n \cdot t_o$), for which the rotating speed N with substantially the same value and the fuel injection amount q with substantially the same value are both maintained, is initiated, the values are successively added, whereby the accumulative total fuel injection amount Q from a new vehicle state (T=0) of the dump truck to the current state or a desired state (T=Σt) is calculated.

(C) Next, a fuel injection amount q1 per unit time (=Q/Σt) is calculated. In this case, in place of the fuel injection amount q1, a conveying amount w1 per unit fuel injection amount (=ΣW·V·t/Q) can be calculated. Further, the fuel injection amount q1 and the conveying amount w1 can be simultaneously calculated.

(D) Next, the calculating portion 83 inputs at least one of the fuel injection amount q1 and the conveying amount w1 to the display portion 9, thereby displaying them.

(E) Further, the structure can be made such that the fuel injection amount q1 and the conveying amount w1 are stored in a memory mounted on the vehicle and can be moved to a magnetic card or the like at a desired time, thereby enabling a display of the detected data on a display apparatus within a building. That is, the calculating means 83a and the output means 83b are included in the calculating portion 83.

In this case, each of the accumulative total fuel injection amount expressed by the "Q", the accumulative time expressed by the "Σt (=T)" and the accumulative work load expressed by the "ΣW·V·t" corresponds to an accumulative value from a new car state (T=0) of the dump truck to the current state or the desired state (T=Σt).

In this case, in addition to the dump truck, in a self-propelled vehicle, such as a wheel loader, a motor scraper, and the like, an operation stop is frequently caused on the basis of a waiting, a maintenance, a suspension of a vehicle, and the like. Accordingly, in order to store each of the accumulative values Q, Σt and ΣW·V·t even when the operation is stopped, the controller 8 is connected to a backup power source 15. In this case, the structure can be made such that in place of the backup power source 15, a memory 84 (RAM), for storing each of the accumulative values within the controller 8, is constituted by a reloadable nonvolatile memory, such as a flash memory, an EEROM, and the like, thereby performing the calculation at the next time of operating.

In accordance with this embodiment, the oscillation interval $t_o$ of the trigger signal d is set to be every 1 minute; however, when the oscillation interval $t_o$ is set to be every 1 second, the rotating speed N of the engine will be set to be a rotating speed per second. In this case, the shorter the oscillation interval $t_o$ is set, the more the accuracy of the accumulative total fuel injection amount Q will be improved, so that the accuracy of the fuel injection amount q1 and the conveying amount w1 will also be improved. However, since an actually used accumulative time T (a time at a time of output) is based on a long order, such as a time after 100 hours have elapsed from the new car state, a time after 500 hours have elapsed, a time after 1000 hours have elapsed, a time after 5000 hours have elapsed, and the like, there is hardly generated a difference in accuracy due to the difference between the case wherein the oscillation interval $t_o$ is set to be 1 minute and the case wherein the oscillation interval to is set to be 1 second. When the fuel injection amount q1 and the conveying amount w1 are outputted frequently (for example, continuously, at every 10 minutes or at every 1 hour), the oscillation interval $t_o$ can be set to 1 second or a time shorter than that.

The command input portion 10 is structured such that the operator gives to the controller 8 a calculation command S for any one of or both of the fuel injection amount q1 and the conveying amount w1, and an output command S to the display portion 9. In this case, when automatically calculating at a predetermined interval (for example, continuously, at every ten minutes, hour, 100 hours, 500 hours, 1000 hours, or 5000 hours) and automatically displaying, the command input portion 10 can be omitted.

The effects in accordance with the present invention are put in order as follows.

(a) The fuel injection amount q1 can be displayed. Since the fuel injection amount q1 corresponds to a value obtained by dividing the accumulative total fuel injection amount Q by the accumulative operation time (Σt), the data cannot be detected in a pinpoint manner as in the prior art, but can be detected as a value including a trend in the engine condition. Accordingly, the maintenance period and the renewal period can be accurately planned.

(b) The conveying amount w1 can be also calculated. Since the conveying amount w1 corresponds to a value obtained by dividing the accumulative work load (ΣW·V·t, so-called ton km) by the accumulative total fuel injection amount Q, the data cannot be detected in a pinpoint manner as in the prior art, but can be detected as a value including a trend in the engine condition. Accordingly, the maintenance period and the renewal period can be accurately planned.

(c) It is possible to calculate and display both of the fuel injection amount q1 and the conveying amount w1. In this case, the maintenance plan, the renewal plan, and the like in a safety side can be made by comparing both of the resulting values and then employing the worse condition.

(d) In most cases, each of the detectors 11, 12, 13, and 14 and the controller 8 are always provided in the dump truck, or the like, even when the purpose thereof is different. Accordingly, the same effects as the items (a) to (c) mentioned above can be easily obtained by only a little upgrading of a conventional controller.

(e) The fuel injection amount q1 and the conveying amount w1 can be stored in a memory mounted on the vehicle, and can be moved to a magnetic card or the like at a desired time, whereby the detected data can be displayed on the display apparatus within the building. Accordingly, a plurality of self-propelled vehicles can be concentrically controlled.

Industrial Applicability

The present invention is useful for a diagnosis apparatus for a self-propelled vehicle, such as a dump truck, and the like, which can plan a maintenance plan, a renewal plan, and the like, of a whole vehicle, by detecting a work load in addition to an engine condition.

What is claimed is:

1. A diagnosis apparatus suitable for use on a vehicle which has an engine mounted thereon and which can convey a loaded material, said diagnosis apparatus comprising:

engine rotating speed detecting means, for detecting a rotating speed N of the engine;

fuel injection amount detecting means, for detecting a fuel injection amount q per rotation of the engine;

loaded weight detecting means, for detecting a weight W of the loaded material;

vehicle speed detecting means, for detecting a speed V of the vehicle;

trigger signal oscillating means, for oscillating a trigger signal d per predetermined time period $t_o$; and calculating means, which receives a detected rotating speed N from said engine rotating speed detecting means, a thus detected fuel injection amount q from the fuel injection amount detecting means, a thus detected weight W from the loaded weight detecting means, a thus detected vehicle speed V from the vehicle speed detecting means, and a trigger signal d from the trigger signal oscillating means; which calculates a time period t ($=n \cdot t_o$) for which the rotating speed N and the fuel injection amount q are maintained substantially at their same values on a basis of a number n of the trigger signal d; which calculates an accumulative total fuel injection amount Q ($=\Sigma q \cdot N \cdot t$); and which calculates at least one of a fuel injection amount q1 ($=Q/\Sigma t$) per unit time and a conveying amount w1 ($=\Sigma W \cdot V \cdot t/Q$) per unit fuel injection amount.

2. A diagnosis apparatus in accordance with claim 1, further comprising an output means, for receiving from said calculating means at least one of said fuel injection amount q1 per unit time and said conveying amount w1 per unit fuel injection amount, and for outputting a thus received amount to a display apparatus.

3. A diagnosis apparatus in accordance with claim 2, wherein said display apparatus is located in a building.

4. A diagnosis apparatus in accordance with claim 2, wherein said display apparatus is located outside of the vehicle.

5. A diagnosis apparatus in accordance with claim 4, wherein said calculating means calculates said fuel injection amount q1 per unit time, and said output means outputs to said display apparatus a thus calculated fuel injection amount q1 per unit time.

6. A diagnosis apparatus in accordance with claim 4, wherein said calculating means calculates said conveying amount w1 per unit fuel injection amount, and said output means outputs to said display apparatus a thus calculated conveying amount w1 per unit fuel injection amount.

7. A diagnosis apparatus in accordance with claim 1, wherein said calculating means calculates said fuel injection amount q1 per unit time.

8. A diagnosis apparatus in accordance with claim 1, wherein said calculating means calculates said conveying amount w1 per unit fuel injection amount.

9. A diagnosis apparatus in accordance with claim 1, wherein said calculating means calculates said conveying amount w1 per unit fuel injection amount and said fuel injection amount q1 per unit time.

10. Apparatus comprising:
a vehicle which has an engine mounted thereon and which can convey a loaded material;
engine rotating speed detecting means, for detecting a rotating speed N of the engine;
fuel injection amount detecting means, for detecting a fuel injection amount q per rotation of the engine;
loaded weight detecting means, for detecting a weight W of the loaded material;
vehicle speed detecting means, for detecting a speed V of the vehicle;
trigger signal oscillating means, for oscillating a trigger signal d per predetermined time period $t_o$; and
calculating means, which receives a detected rotating speed N from said engine rotating speed detecting means, a thus detected fuel injection amount q from the fuel injection amount detecting means, a thus detected weight W from the loaded weight detecting means, a thus detected vehicle speed V from the vehicle speed detecting means, and a trigger signal d from the trigger signal oscillating means; which calculates a time period t ($=n \cdot t_o$) for which the rotating speed N and the fuel injection amount q are maintained substantially at their same values on a basis of a number n of the trigger signal d; which calculates an accumulative total fuel injection amount Q ($=\Sigma q \cdot N \cdot t$); and which calculates at least one of a fuel injection amount q1 ($=Q/\Sigma t$) per unit time and a conveying amount w1 ($=\Sigma W \cdot V \cdot t/Q$) per unit fuel injection amount.

11. Apparatus in accordance with claim 10, further comprising:
a display apparatus; and
an output means, for receiving from said calculating means at least one of said fuel injection amount q1 per unit time and said conveying amount w1 per unit fuel injection amount, and for outputting a thus received amount to the display apparatus.

12. Apparatus in accordance with claim 10, wherein said output means comprises a magnetic card.

13. Apparatus in accordance with claim 10, wherein said display apparatus is located in a building.

14. Apparatus in accordance with claim 10, wherein said display apparatus is located outside of the vehicle.

15. Apparatus in accordance with claim 14, wherein said calculating means calculates said fuel injection amount q1 per unit time, and said output means outputs to said display apparatus a thus calculated fuel injection amount q1 per unit time.

16. Apparatus in accordance with claim 14, wherein said calculating means calculates said conveying amount w1 per unit fuel injection amount, and said output means outputs to said display apparatus a thus calculated conveying amount w1 per unit fuel injection amount.

17. Apparatus in accordance with claim 10, wherein said calculating means calculates said fuel injection amount q1 per unit time.

18. Apparatus in accordance with claim 10, wherein said calculating means calculates said conveying amount w1 per unit fuel injection amount.

19. Apparatus in accordance with claim 10, wherein said vehicle is a self-propelled vehicle.

20. Apparatus in accordance with claim 10, wherein said calculating means calculates said conveying amount w1 per unit fuel injection amount and said fuel injection amount q1 per unit time.

* * * * *